United States Patent
Bailey et al.

(10) Patent No.: US 7,673,721 B2
(45) Date of Patent: Mar. 9, 2010

(54) ELECTRICALLY ACTUATED AIRCRAFT BRAKES

(75) Inventors: David Alexander Bailey, Coventry (GB); Jonathan Deric Lumb, Coventry (GB); Andrew Whittingham, Coventry (GB)

(73) Assignee: Meggitt Aerospace Limited, Coventry (GB)

( * ) Notice: Subject to any disclaimer, the term of this patent is extended or adjusted under 35 U.S.C. 154(b) by 260 days.

(21) Appl. No.: 11/577,757

(22) PCT Filed: Jan. 9, 2006

(86) PCT No.: PCT/GB2006/000062

§ 371 (c)(1),
(2), (4) Date: Apr. 23, 2007

(87) PCT Pub. No.: WO2006/072802

PCT Pub. Date: Jul. 13, 2006

(65) Prior Publication Data
US 2009/0084637 A1    Apr. 2, 2009

(30) Foreign Application Priority Data
Jan. 8, 2005   (GB) ............................... 0500304.1

(51) Int. Cl.
*F16D 55/36* (2006.01)
(52) U.S. Cl. ............................... 188/1.11 L; 188/71.5
(58) Field of Classification Search ............ 188/1.11 E, 188/1.11 L; 116/208; 340/454
See application file for complete search history.

(56) References Cited

U.S. PATENT DOCUMENTS

| | | | | |
|---|---|---|---|---|
| 5,939,978 A | * | 8/1999 | Kyrtsos | 340/454 |
| 6,003,640 A | | 12/1999 | Ralea | |
| 6,959,794 B2 | * | 11/2005 | Ralea et al. | 188/156 |
| 7,011,186 B2 | * | 3/2006 | Frentz et al. | 188/1.11 L |
| 7,445,091 B2 | * | 11/2008 | Kawahara et al. | 188/1.11 L |
| 2004/0084252 A1 | | 5/2004 | Devlieg | |
| 2009/0114488 A1 | * | 5/2009 | Bailey et al. | 188/1.11 E |

OTHER PUBLICATIONS

International Search Report.

* cited by examiner

*Primary Examiner*—Christopher P Schwartz
(74) *Attorney, Agent, or Firm*—Renner, Kenner, Greive, Bobak, Taylor & Weber

(57) ABSTRACT

Method and apparatus for monitoring electrically-actuated aircraft brakes includes measuring the break heat pack thickness to determine wear of the brake discs and adjusting the measurement so as to give ongoing compensation for temperature variations and hence expansion of the heat pack.

10 Claims, 1 Drawing Sheet

ELECTRICALLY ACTUATED AIRCRAFT BRAKES

BACKGROUND OF THE INVENTION

The invention relates to electrically actuated aircraft brakes and is more particularly but not exclusively concerned with the wear measurement and adjustment of such brakes.

Aircraft brakes are typically of a multi disc type with carbon-carbon composite (C—C) friction discs and feature hydraulically actuated rams (pistons) to generate the clamping force across the brake heat pack to generate friction at the disc interfaces. A brake heat stack comprising C—C stator discs keyed to a non-rotating torque tube and C—C rotor discs keyed to the rotating wheel and interleaved between the stators generates the friction forces for braking and absorbs the kinetic energy of the aircraft as heat. Brake actuation is under the control of an electronic control unit (ECU) controlling braking force in response to a brake demand signal and monitoring braking through signals representing parameters such as brake pressure, brake torque, deceleration, wheel speed and skid activity.

It is important for aircraft safety that the brake heat stacks have sufficient capacity to absorb the kinetic energy of the aircraft during an emergency braking event such as a Rejected-Take-Off. This requirement dictates a minimum heat stack mass that must be available and it is critical that the amount of material remaining in the brake heat stack, normally identified by the thickness of the heat stack, can be monitored to ensure that heat stacks are replaced at the appropriate time.

Brake heat stack thickness is monitored manually by examining the length of a wear pin attached to the brake stator disc at the end of the brake heat stack where the brake pressure is applied. Such wear pins indicate the thickness of material remaining in the brake heat stack before maintenance action is required.

As technology is introduced for the more electric aircraft there is an emerging trend towards using electrically powered actuator rams for aircraft brakes. In such actuators the movement to apply and release the brake clamping force in the actuator ram is driven by an electric motor through a mechanism such as gears or ball screws. The use of electric actuation allows the actuator to become more intelligent with the capability to provide information such as actuator position to the brake control system.

U.S. Pat. No. 6,003,640 in the name of Goodrich describes a system using position sensors coupled to the actuator ram to determine actuator ram position. By detecting the position of the actuator when it is in contact with the closed brake heat stack during a calibration routine and comparing this position with a previously determined reference position the brake heat stack wear is determined.

The use of wear pins in hydraulically actuated brakes and, for electric actuators, a system of the type proposed in U.S. Pat. No. 6,003,640, takes no account of brake temperature when determining heat stack position and wear of the brake heat stack.

Expansion of the C—C brake heat stack is typically in the order of $12 \times 10^{-6}$ $C.^{-1}$. This is equivalent to 1.2 mm per 1000° C. per 100 mm of heat stack thickness. For a typical medium size civil aircraft carbon-carbon brake heat stack with total thickness of 200 mm this gives an expansion of 2.4 mm between ambient and 1000° C. For a typical civil aircraft carbon-carbon brake heat stack with total thickness of 300 mm this gives an expansion of 3.6 mm between ambient and 1000° C.

Thermal expansion of a brake friction material with a positive expansion coefficient will be a positive value when the brake heat stack is increasing in temperature and a negative value when the brake heat stack is cooling. When the brake heats during a braking cycle the heat stack will expand. When the brake cools down between braking cycles the heat stack will contract If the brake heat stack thickness is measured when the brake heat stack is at an elevated temperature then, when the heat stack then cools below the temperature at which the heat stack thickness was measured, the brake heat stack will contract due to the cooling, thereby decreasing the heat stack thickness. If the system is monitoring brake wear or amount of wear remaining in the brake heat stack a distorted assessment of wear or remaining material will be obtained, resulting in an incorrect evaluation of remaining cycles to overhaul if the system uses algorithms to assess remaining brake life.

Brake control systems such as that featured in WO 02/12043 can now use information on heat stack thickness, derived from amount of material worn away from new or the amount of material remaining above heat pack fully worn thickness to determine the remaining life of the brake heat stack before removal is required.

To obtain a measurement of brake heat stack thickness that can be used to derive accurate information on brake wear the determination of heat stack thickness can only be carried out when the brake is at ambient temperature, or at a temperature at which expansion is considered to be negligible.

If automatic wear measurement is to replace visual inspection of the brakes, several problems must be overcome. Currently, it is the responsibility of the pilot to carry out a visual inspection of components such as the tyres, engines and brakes to ensure the aircraft meets operational requirements.

If wear pins are removed from brake assemblies the pilot requires an indication of the health of the brake so that the pilot can fulfil his responsibilities. A user initiated wear measurement would give the necessary information, however the system detailed in U.S. Pat. No. 6,003,640 can only operate when the brake is at ambient temperature. As styles of operation change, some airlines run aircraft on an almost back to back schedule of flights with several different pilots flying any individual plane in a given tour of duty. Each one of these pilots must obtain an accurate wear measurement and will not be able to rely on a previous measurement taken that day as it could have been taken 20 flight cycles earlier.

Airlines are under increasing pressure to fully utilise their asset, so pressure to reduce turn round times—particularly for shorter flights, is high. The limiting factor is often brake temperature, as the brake must be capable of a full Rejected Take Off (RTO) before the aircraft can be released. Typically the limiting temperature is set at around 300° C., though it can be as high as 400° C. This could relate to an axial expansion of over 1 mm on a 300 mm heat stack, resulting in an unacceptable error in wear measurement. For instance, if 0.1 mm of wearable material was remaining at the start of a tour of duty, heavy wear or contamination of the heat stack with de-icer could occur and cause the brake to go below safe limits for heat stack size. Any wear measurement taken without temperature compensation at a temperature of 50° above ambient could result in a brake giving an indication that it is in a healthy condition when it is in fact below the allowable limit.

For electrically actuated brakes the opportunity to carry out a calibrated heat stack wear measurement of the type proposed by Goodrich in U.S. Pat. No. 6,003,640 is limited to maintenance periods where the aircraft is out of service. In addition, information on heat pack wear is required to track wear of the heat pack in order to inform that maintenance is required so there is a need for representative wear information to be recorded on an ongoing basis during operating cycles. This cannot be provided if the actuator ram position for contact with the closed heat stack heat pack thickness is being determined as the position will change with brake temperature.

SUMMARY OF THE INVENTION

According to one aspect of the invention, there is provided a method and apparatus for measuring and monitoring brake heat stack thickness to compensate for temperature variations above ambient temperature in the heat stack that would cause expansion of the brake heat stack.

According to a second aspect of the invention, there is provided a method and apparatus for measuring and monitoring brake heat stack thickness to compensate for temperature variations above ambient temperature in the heat stack that would cause expansion of the brake heat stack and determining the equivalent heat stack thickness at ambient temperature.

According to a third aspect of the invention, there is provided a method and apparatus for determining the point at which the actuator ram contacts the closed brake heat stack, calculating heat stack thickness from this position and compensating the brake heat stack thickness for any temperature difference above ambient to determine the equivalent heat stack thickness at ambient temperature.

According to a fourth aspect of the invention, there is provided a method and apparatus for determining brake wear by calculating the measured actuator ram position or heat stack thickness to compensate for any temperature variation from ambient.

According to a fourth aspect of the invention, there is provided a method and apparatus for predicting the remaining service life of a brake heat stack by determining brake wear by calculating the measured actuator ram position or heat stack thickness to compensate for any temperature variation from ambient and using the compensated brake wear figure to predict the remaining brake life.

One exemplary embodiment of the invention comprises an aircraft braking systems utilising electrical actuation to apply the brake clamping load. Such brakes are known and typically comprise a multi disc brake heat stack and a servo-mechanism for application of brake pressure. The multi disc heat stack comprises:

Carbon-Carbon composite (C—C) stator discs keyed to the torque tube fixedly mounted to a brake plate and mounted axially about an axle; and C—C rotor discs interleaved between the stator discs and keyed to the inside of a wheel that is rotatably mounted by bearing means to the axle.

The servo mechanism consists of:

A plurality of electric actuator modules fixedly mounted around a brake plate, each actuator comprising a motor driving, through a gear box mechanism, a ballscrew to produce linear motion in an actuator ram applying and withdrawing load to the brake heat stack.

Position sensor to provide a signal representative of actuator position. The position sensor could be of a type connected to the actuator rams, however the sensor is preferably a resolver mounted so as to sense movement of the motor shaft. The use of a resolver is preferred as it is present in the system to measure motor speed and reduces the parts count in the actuator module if additional position sensors are not required. Position of the actuator ram is processed by the ECU through algorithms taking into account the motor shaft rotation signal from the resolver and gear ratios through the gearbox and ball screw mechanism to deduce the actuator movement and position from a reference point.

Current sensor to detect motor current, this being representative of the load applied to the brake or, alternatively, a pressure load cell positioned within the brake to give a signal directly representative of brake load.

Electronic Control Unit (ECU) capable of providing current to the motor for moving the actuator into and out of forceful engagement and controlling the position of the actuator relative to the feedback signal from the position sensor.

Additional sensors are fitted as required for monitoring parameters such as temperature, wheel speed and brake torque.

At ambient temperature the size of the heat stack is known following a calibration routine. The calibration routine can be carried out in a number of ways, however a preferred method would involve driving the actuator ram forward until the heat pack is closed. This condition is detected by an increase in the motor current above a predetermined value or by the use of a load cell to detect when the load in the actuator ram reaches a predetermined threshold. The actuator ram position and hence the position for the actuator contact face of the heat stack is then known from the information provided by the position sensor and processed by the electronic control unit (ECU).

From the position at which the actuator ram contacts the heat stack the heat stack thickness can be calculated by comparing actuator ram contact position against one or more of the following known reference positions:

the position of the opposite end face (reaction end) of the heat stack to give heat stack length;

the position of the actuator contact face for a predetermined minimum heat stack thickness to give actual heat stack thickness, remaining brake material thickness and remaining brake life;

the position of the actuator contact face when the heat stack was new to give the amount of brake wear.

The measured brake heat pack position, and hence heat stack thickness, can be adjusted to compensate for brake temperature. If brake temperature is above ambient the equivalent heat pack position at ambient temperature can be calculated by algorithms in the software of the brake control ECU by reference to the thermal expansion and difference between actual heat stack temperature and ambient and recorded by the system.

The brake temperature can be measured using a single thermocouple or a plurality of thermocouples placed in a position or position to give a temperature representative of the heat pack. Alternatively, the temperature can be calculated using measured parameters representative of the energy input to the brake during a braking event and heat pack mass, calculated from the remaining heat pack thickness.

The temperature compensated brake heat, stack position or brake heat stack thickness can then be compared against a reference value for the new heat pack to determine heat pack wear. Alternatively, it is preferable for the temperature compensated brake heat pack position or brake heat stack thickness to then be compared against a reference value for the fully worn heat stack to determine the amount of wearable material remaining and absolute heat pack size. This does away with the need for a separate brake wear determining step conducted at ambient temperature and allows brake heat pack wear to be measured and recorded throughout normal brake operation.

With the ability to determine the absolute heat pack size during operation cycles of the aircraft the brake control system can also be used to determine remaining service cycles in a brake heat stack and hence extend the measurement of wear to create a predictive tool for maintenance planning. Such maintenance planning can be carried out using algorithms such as, for example:

current average service cycle;
average wear rate;
brake energy estimation; and
remaining service cycles to overhaul.

BRIEF DESCRIPTION OF SEVERAL VIEWS OF THE DRAWINGS

In order that the invention may be well understood, embodiments thereof will now be described, by way of example only, with reference to the accompanying diagrammatic drawings in which.

DETAILED DESCRIPTION OF THE PREFERRED EMBODIMENTS

Figure 1:
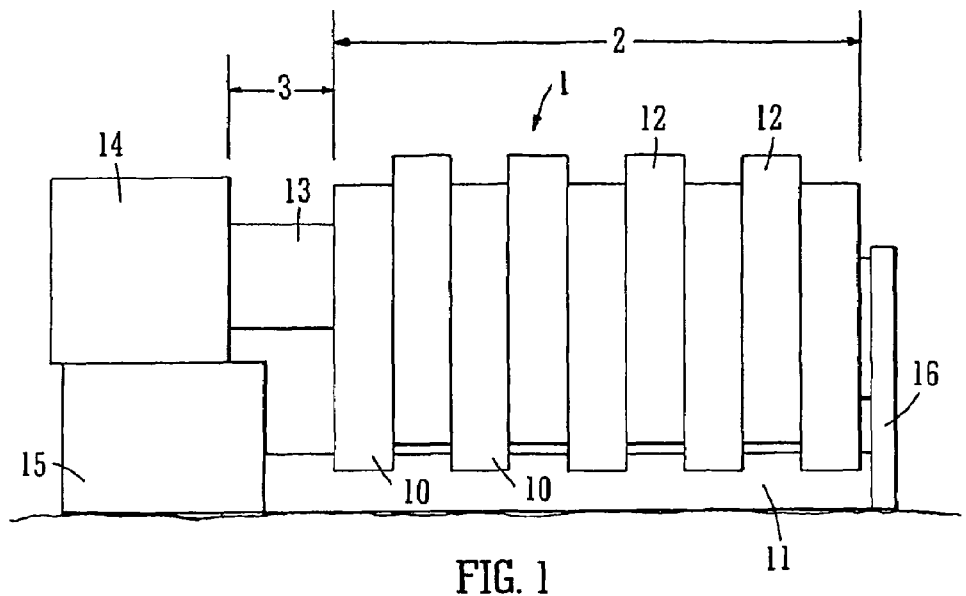
FIG. 1 shows the heat stack thickness for a fully closed heat stack at ambient temperature and FIG. 2 shows the same heat stack at elevated temperature following a braking event actuation with the heat stack thickness increased by thermal expansion.

FIG. 1 represents a section of a brake assembly comprising a brake heat pack 1 comprising a plurality of carbon-carbon composite stator discs 10 keyed to a torque tube 11 and axially mounted about a wheel axle (not shown). Interleaved between the stator discs are a corresponding number of rotor discs 12 keyed to the inside of a wheel (not shown) for rotation with the wheel. The stator and rotor discs in the brake heat pack are brought into frictional engagement by the application of the braking load by a plurality of actuator rams 13 which are arrayed around the wheel axis but only one of which is visible in the figure. Each ram 13 is driven by a motor (not shown) through a gear and ball screw mechanism (not shown) housed within a respective electrically powered actuator module body 14. The plurality of actuator modules 14 are mounted around a brake plate 15 to which the torque tube is attached. The brake plate is non-rotatably mounted to the aircraft landing gear (not shown). A reaction member 16 is provided at the opposite end of the torque tube from the actuator modules to oppose the braking force applied by the actuators.

To measure the heat pack thickness 2 at ambient temperature an Electronic Control Unit (ECU) (not shown) first determines the actuator position when the heat pack 1 is closed, i.e. when the rams 13 have moved forward until the discs 10 and 12 have closed together and there is no clearance between them. The fact that the heat stack has reached its position can be determined by the electric actuator motor current increasing above a predetermined level. Alternatively, the ram or actuator can be fitted with a load transducer.

The position of the actuator ram when the brake heat stack is fully closed is determined by the ECU processing a signal from a resolver mounted on the motor shaft to monitor rotation of the motor. Alternatively, other position sensing means can be used such as a position sensor mounted directly to the actuator ram.

From the position at which the actuator ram contacts the fully closed heat pack the heat pack thickness 2 can be calculated by comparing the actuator ram contact position against one or more of the following known reference positions:

the position of the opposite end face (reaction end) of the heat pack to give heat pack length;

the position of the actuator contact face for a predetermined minimum heat pack thickness to give actual heat pack thickness, remaining brake material thickness and remaining brake life;

the position of the actuator contact face when the heat pack was new to give the amount of brake wear and hence the remaining heat pack thickness.

The measured distance 3 is the length of the ram 13 between the actuator 14 and the adjacent disc.

Figure 2:
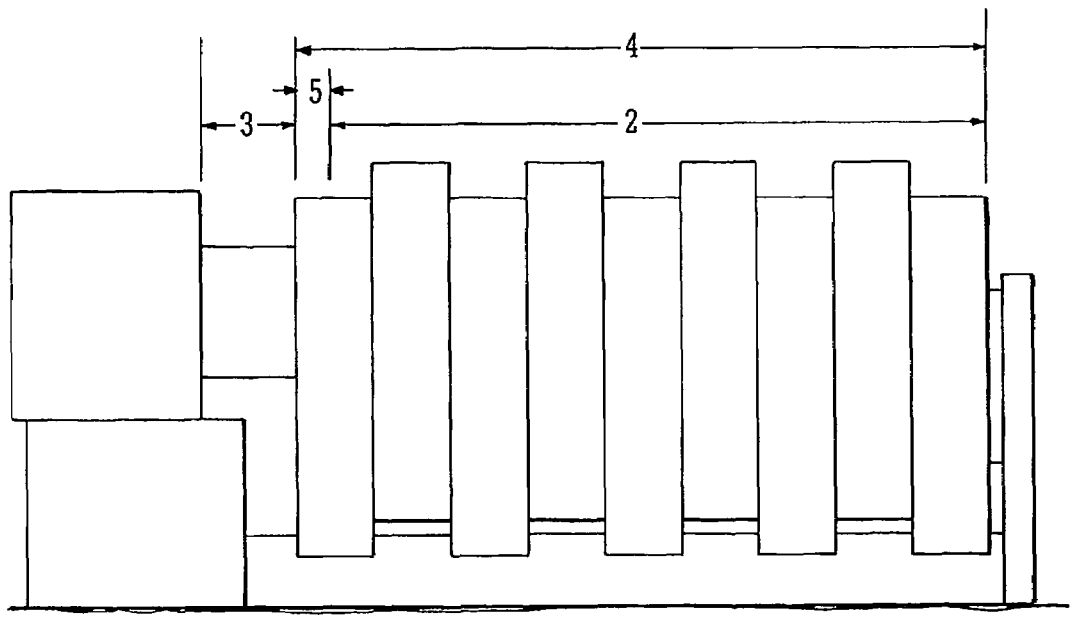

FIG. 2 represents a section through the brake assembly of FIG. 1 when the rotor discs and stator discs of the heat pack are at an elevated temperature following a braking event. The expansion of the carbon-carbon composite material in the axial direction causes an increase 5 in the length of the heat pack due to thermal expansion to give a new overall heat pack thickness 4. The actuator position for the fully closed heat stack is determined to calculate heat stack thickness at elevated temperature as outlined in FIG. 1 for the heat stack at ambient temperature.

The heat stack thickness at elevated temperature is greater than the heat stack thickness at ambient. If the wear condition of the brake is to be determined to ensure there is sufficient brake friction material heat mass in the heat stack prior to aircraft despatch then the heat stack length at ambient temperature must be determined prior to despatch. If the heat stack length is measured at elevated temperature it will then need to be corrected to an at ambient temperature value in order to establish the absolute heat stack thickness.

Correction of the heat stack thickness to account for temperature difference above ambient can be carried out in the ECU by using algorithms to take into account heat stack temperature, heat stack thickness and thermal expansion of the heat stack in the axial direction.

The heat stack temperature can be determined by the use of a thermocouple or thermocouples positioned in the heat stack to provide a representative temperature or, alternatively, by an algorithm in the ECU from brake heat stack mass, specific heat of the heat stack material and a calculated energy input during braking.

With the ability to determine the absolute heat pack size during operating cycles of the aircraft the brake control system can also be used to determine remaining service cycles in a brake heat stack and hence extend the measurement of wear to create a predictive tool for maintenance planning. Such maintenance planning can be carried out using the following algorithms:

1. Current Average Service Cycle

Inputs: Brake energy estimation, Weight-On-Wheels (WOW), Aircraft usage monitor, brake usage monitor Outputs: Number of hot taxi snubs per service cycle, Number of cold taxi snubs per service cycle, average landing brake energy, number of service cycles completed, (standard deviations for all parameters to confirm the averages are meaningful)

Description: The most effective way of determining a service cycle is probably to use WOW or wheel speed spin up to determine whether a take off or landing has occurred. By determining this event and counting the number of brake applications using a brake usage monitor a moving average service cycle can be determined.

2. Average Wear Rate
Inputs: Absolute (ambient temperature) heat stack size, current average service cycle, number of service cycles completed
Outputs: Wear rate per service cycle
Description: By averaging wear over the current service cycles total, a good approximation of the wear per service cycle can be determined relative to the operating conditions of the particular aircraft.

3. Brake Energy Estimation
Inputs: Wheel speed, brake demand, aircraft mass, slip
Outputs: Brake energy input
Description: Using the parameters described above an approximation of the energy input to the brake can be made. This can be used with wheelspeed data to classify brake applications as high/low energy and taxi or landing stops.

4. Remaining Service Cycles to Overhaul
Inputs: Current average service cycle, absolute (ambient temperature) heat stack size, reject size, average wear per service cycle
Outputs: Remaining service cycles
Description: This function will determine the remaining amount of wearable material then divide it by the average wear rate per service cycle to give the remaining service cycles to overhaul.

These algorithms utilise historic data on aircraft usage to determine the average wear rate and amount of wear remaining to predict the number of service cycles remaining before the heat stack will reach a fully worn or reject thickness.

Without further elaboration of the foregoing will so fully illustrate our invention that others may, by applying current or future knowledge, adapt the same for use under various conditions of service.

The invention claimed is:

1. A method for monitoring an aircraft braking system including measuring the brake heat pack thickness and temperature, adjusting the measured thickness by taking into account the temperature and the coefficient of thermal expansion of the heat pack in order to compensate for temperature variations above ambient temperature in the heat pack that would cause expansion of the brake heat pack, and comparing the adjusted thickness value with a reference value measured at ambient temperature in order to determine the overall disc wear.

2. A method according to claim 1, including determining an equivalent heat pack thickness at ambient temperature.

3. A method according to claim 1, including measuring the heat pack thickness from the point at which an actuator ram contacts the closed heat pack and adjusting the measured brake heat pack thickness for any temperature difference above ambient to determine the equivalent heat pack thickness at ambient temperature.

4. A method according to claim 3, including measuring the actuator ram position or heat pack thickness to compensate for any temperature variation from ambient.

5. A method according to claim 4, including predicting the remaining service life of a brake heat pack by determining brake wear by adjusting the measured actuator ram position or measured heat stack thickness for any temperature variation from ambient and using the adjusted value to predict the remaining brake life.

6. Apparatus for monitoring an aircraft braking system including means for measuring the brake heat pack thickness, means for measuring the brake heat pack temperature, means for adjusting the measured thickness by taking into account the temperature and the coefficient of thermal expansion of the heat pack in order to compensate for temperature variations above ambient temperature in the heat pack that would cause expansion of the brake heat pack and means for comparing the adjusted thickness value with a reference value measured at ambient temperature in order to determine the overall disc wear.

7. Apparatus according to claim 6, including means for determining the equivalent heat pack thickness at ambient temperature.

8. Apparatus according to claim 6, including means for determining the point at which an actuator ram contacts the closed heat pack and measuring heat pack thickness from this position, and means for adjusting the measured brake heat pack thickness for any temperature difference above ambient to determine the equivalent heat pack thickness at ambient temperature.

9. Apparatus according to claim 8, including means for measuring the actuator ram position or heat pack thickness to compensate for any temperature variation from ambient.

10. Apparatus according to claim 9, including means for predicting the remaining service life of a heat pack by determining brake wear by adjusting the measured actuator ram position or measured heat pack thickness for any temperature variation from ambient and using the adjusted value to predict the remaining brake life.

* * * * *